United States Patent
Arshad et al.

(10) Patent No.: US 10,217,015 B2
(45) Date of Patent: *Feb. 26, 2019

(54) PHYSICAL AND DIGITAL BOOKMARK SYNCING

(71) Applicant: International Business Machines Corporation, Armonk, NY (US)

(72) Inventors: Muneeb Arshad, Poughkeepsie, NY (US); Megan Capobianco, Highland, NY (US); Gregory Ecock, White Plains, NY (US); Vijai Kalathur, Wappingers Falls, NY (US); Christopher R. Potter, Poughkeepsie, NY (US); Daniela Regier, New Paltz, NY (US); William H. Scott, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,499

(22) Filed: Dec. 14, 2017

(65) Prior Publication Data

US 2018/0300575 A1  Oct. 18, 2018

Related U.S. Application Data

(63) Continuation of application No. 15/487,487, filed on Apr. 14, 2017.

(51) Int. Cl.
*G06F 3/12* (2006.01)
*H04N 1/04* (2006.01)
(Continued)

(52) U.S. Cl.
CPC ........... *G06K 9/228* (2013.01); *G06F 17/241* (2013.01); *G06K 9/18* (2013.01); *G06K 9/2081* (2013.01); *G06K 9/6201* (2013.01)

(58) Field of Classification Search
CPC ........ G06F 17/241; G06K 9/228; G06K 9/18; G06K 9/2081
(Continued)

(56) References Cited

U.S. PATENT DOCUMENTS 7,151,860 B1 * 12/2006 Sakai ..................... B42C 1/12
382/297
8,194,081 B2 * 6/2012 Marggraff ........... G06F 3/03545
345/179

(Continued)

OTHER PUBLICATIONS

IBM, "Synchronized Companion Tabs and Synchronized Bookmarks to Aid Navigating Web Sites or Web Applications," http://ip.com/IPCOM/000143271D; Nov. 17, 2006.
(Continued)

*Primary Examiner* — Cheukfan Lee
(74) *Attorney, Agent, or Firm* — Maeve Carpenter; George S. Blasiak; Heslin Rothenberg Farley & Mesiti PC

(57) ABSTRACT

Methods, computer program products, and systems are presented. The method computer program products, and systems can include, for instance: obtaining image data representing page content of a physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book.

20 Claims, 9 Drawing Sheets

(51) Int. Cl.
*G06K 9/22* (2006.01)
*G06K 9/18* (2006.01)
*G06K 9/62* (2006.01)
*G06F 17/24* (2006.01)
*G06K 9/20* (2006.01)

(58) Field of Classification Search
USPC ......... 382/321, 312, 313, 305, 306; 358/1.9, 358/1.15, 473, 442
See application file for complete search history.

(56) References Cited

U.S. PATENT DOCUMENTS

| | | | |
|---|---|---|---|
| 8,682,851 B2 | 3/2014 | Weber et al. | |
| 9,047,356 B2 | 6/2015 | Puppin | |
| 9,049,398 B1* | 6/2015 | Moscovich | H04N 1/40 |
| 9,911,105 B1* | 3/2018 | Brown | G06Q 20/123 |
| 2002/0167534 A1* | 11/2002 | Burke | G06F 3/0481 |
| | | | 345/629 |
| 2009/0267923 A1* | 10/2009 | Van Schaack | G06F 3/03545 |
| | | | 345/179 |
| 2011/0050594 A1* | 3/2011 | Kim | G06F 3/04847 |
| | | | 345/173 |
| 2012/0192093 A1* | 7/2012 | Migos | G06F 3/04883 |
| | | | 715/773 |
| 2013/0047125 A1* | 2/2013 | Kangas | G06F 3/0483 |
| | | | 715/863 |
| 2013/0212454 A1 | 8/2013 | Casey | |
| 2014/0118800 A1* | 5/2014 | Hwang | H04N 1/00331 |
| | | | 358/474 |
| 2014/0173495 A1* | 6/2014 | Chang | G06F 3/04883 |
| | | | 715/776 |
| 2014/0245123 A1* | 8/2014 | Pircher | G06F 17/241 |
| | | | 715/232 |
| 2015/0185982 A1* | 7/2015 | Hicks | G06F 3/0483 |
| | | | 715/776 |
| 2015/0242061 A1* | 8/2015 | Patel | G06F 3/017 |
| | | | 715/765 |
| 2016/0043974 A1 | 2/2016 | Purcell et al. | |
| 2017/0351651 A1* | 12/2017 | Kaur | G06F 17/241 |

OTHER PUBLICATIONS

IBM, "System and Method of a Centralized Portable Media Bookmark Between Multiple Media Types and Formats," http://ip.com/IPCOM/000174699D; Sep. 18, 2008.
List of IBM Patent and/or Patent Applications treated as related for U.S. Appl. No. 15/842,499, filed Dec. 14, 2017, dated Dec. 9, 2017.
Arshad, et al. "Physical and Digital Bookmark Syncing" U.S. Appl. No. 15/487,487, filed Apr. 14, 2017.
Non-Final Office action for U.S. Appl. No. 15/487,487, filed Apr. 14, 2017 dated Jul. 12, 2018.
Applicant's Response to Non-Final Office action for U.S. Appl. No. 15/487,487, filed Apr. 14, 2017, dated Jul. 31, 2018.
Notice of Allowance in U.S. Appl. No. 15/487,487 dated Oct. 1, 2018.
Applicant's Communication to Record Substance of Interview for U.S. Appl. No. 15/487,487, filed Apr. 14, 2017, dated Sep. 26, 2018.
Non-Final Office action in U.S. Appl. No. 15/487,487 dated Jul. 2, 2018.

* cited by examiner

PHYSICAL AND DIGITAL BOOKMARK SYNCING

CROSS-REFERENCE TO RELATED APPLICATION

This application is a continuation of U.S. patent application Ser. No. 15/487,487, filed Apr. 14, 2017, entitled, "Physical and Digital Bookmark Syncing," the entirety of which is hereby incorporated herein by reference.

BACKGROUND

An electronic book (e-book) is a book-length publication in digital form, comprising text, images, or both. An electronic book may be produced on, published through, and readable on computers and other electronic devices. For example, e-books may be read on dedicated hardware devices known as electronic readers, on personal computers, tablet computers and mobile phones.

People who are accustomed to using traditional books often find and remember content in documents in an intuitive manner, for example, by recalling various visual aspects of a page, even including the degree of page use by dirt on a page, or by flipping through books and finding content. The speed of manual flipping of pages in an actual book can depend on certain factors, for example, use of the book, and the condition of pages and book spines. Delays in page flipping caused by one or more of these factors can help a user find content. Presently, no known methods exist to help individuals perform equivalent actions in e-books, whether the content resides on dedicated readers, smart phones, tablets, or other such devices.

Current technology allows users of electronic readers or other computer devices on which electronic books can be read, to manually create simple bookmarks, which allow users to "jump" to sections of electronic books. Additional known methods permit manually highlighting lines of text and annotating electronic books, for example, by using a stylus.

SUMMARY

Shortcomings of the prior art are overcome, and additional advantages are provided, through the provision, in one aspect, of a method. The method can include, for example: obtaining image data representing page content of a physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book.

In another aspect, a computer program product can be provided. The computer program product can include a computer readable storage medium readable by one or more processing unit and storing instructions for execution by one or more processor for performing a method. The method can include, for example: obtaining image data representing page content of a physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining image data representing page content of a physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book.

Shortcomings of the prior art are overcome, and additional advantages are provided, through the provision, in one aspect, of a method. The method can include, for example: obtaining image data representing page content of a physical book, wherein the obtaining image data is responsive to physical bookmarking of the physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book, wherein the digitally bookmarking is synchronized to the physical bookmarking so that a digital bookmark of the electronic book is provided at a location of the electronic book corresponding to a location of the physical book that is bookmarked by the physical bookmarking.

In another aspect, a computer program product can be provided. The computer program product can include a computer readable storage medium readable by one or more processing unit and storing instructions for execution by one or more processor for performing a method. The method can include, for example: obtaining image data representing page content of a physical book, wherein the obtaining image data is responsive to physical bookmarking of the physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book, wherein the digitally bookmarking is synchronized to the physical bookmarking so that a digital bookmark of the electronic book is provided at a location of the electronic book corresponding to a location of the physical book that is bookmarked by the physical bookmarking.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining image data representing page content of a physical book, wherein the obtaining image data is responsive to physical bookmarking of the physical book; running a character recognition process to process the image data for providing a text string of machine encoded text corresponding to text of the physical book; identifying within a data repository that stores one or more electronic book a string of text of an electronic book that matches the text string of machine encoded text; and based on the identifying, digitally bookmarking the electronic book, wherein the digitally bookmarking is synchronized to the physical bookmarking so that a digital bookmark of the electronic book is provided at a location of the electronic book corresponding to a location of the physical book that is bookmarked by the physical bookmarking.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
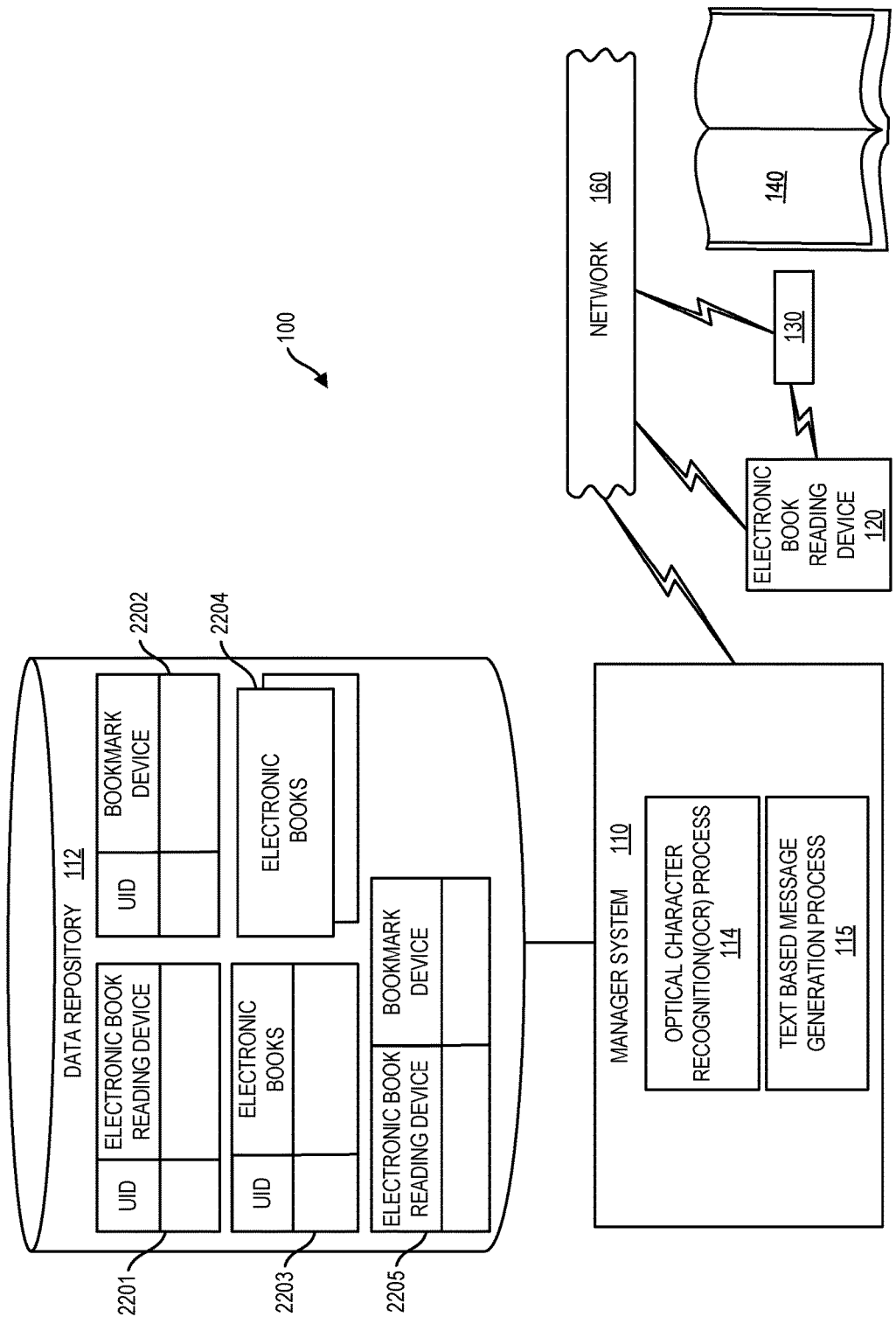
FIG. 1 depicts a system having manager system, and electronic book reading device, and a bookmark device in one embodiment.

In FIG. 1 there is shown an embodiment of a system 100 for use in synchronization between physical book reading and electronic book reading. In system 100 there can be included, manager system 110, an electronic book reading device 120 for reading electronic books, a bookmark device 130, and a physical book 140. Manager system 110 can include an associated data repository 112 storing various data e.g. a user reader association table 2201, a user-to-bookmark association table 2202, a user-to-electronic books association table 2203, and an area 2204 for storing electronic books. System 100 can have a plurality of electronic book reading devices configured according to electronic book reading device 120 associated to different users, and a plurality of bookmark devices configured according to bookmark device 130 associated to different users. Manager system 110, electronic book reading device 120 and bookmark device 130 can be computing node based devices in communication with one another via network 160. For example, network 160 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

Referring to FIG. 1, manager system 110 including its associated data repository 112 in one embodiment can be external to electronic book reading device 120 and bookmark device 130. In one embodiment, manager system 110 including its associated data repository 112 can be co-located with electronic book reading device 120. In one embodiment, manager system 110 can be co-located with bookmark device 130.

Referring to electronic book reading device 120, electronic book reading device 120 can be a computer device for reading an electronic book. In one embodiment electronic book reading device 120 can be provided by a smartphone or a tablet and in one embodiment can be provided by a device referred to a an "electronic reader" "e-reader" "electronic book reader" or "e-book reader" having features such as "electronic paper" specifically configuring the device to optimize display of text for reading of electronic books.

Bookmark device 130 can be a computer node based device having a form factor according to a form factor of a traditional analog bookmark. Bookmark device 130 can have dimensions according to a traditional analog bookmark. In one embodiment, bookmark device 130 can be thin and generally planar. In one embodiment, bookmark device 130 can be in the form of an elongated rectangle having a small thickness e.g. on the order of about 2.0 centimeters or less. In one embodiment bookmark device 130 can be rigid or semi-rigid. In another embodiment, bookmark device 130 can comprise flexible electronics packaging and components and can be formed to be flexible. By it is inclusion of electronic circuitry, bookmark device 130 can be regarded as an electronic bookmark device.

Bookmark device 130 can be used in conjunction with physical book 140. Physical book 140 can be a physical book in the traditional form of a printed, published book e.g. in one embodiment can include paper pages, bound by a binding, the pages can be thin and flexible, and printed matter e.g. provided by rows of text can be formed on the pages e.g. by typing or printing.

According to system 100, bookmark device 130 can be used in combination with physical book 140 and electronic book reading device 120. For example, a user can be reading physical book 140 and when completing a reading session of physical book 140 can perform physical bookmarking to mark the location of the physical book 140 last read using bookmark device 130 in the same manner as the user would in the case that a traditional bookmark was used instead of a bookmark device 130. Based on the placement of the bookmark device 130 in the physical book 140, system 100 can be operative so that while performing physical bookmarking of a physical book 140 using bookmark device 130, bookmark device 130 can be collecting image data representing content of one or more row of text of a physical page of physical book 140.

According to system 100, character recognition processing can be used to process the image data representing content of the one or more row of a physical page of physical book 140 for providing a text string of machine-encoded text corresponding to the one or more row of physical page form text of physical book 140. System 100 can identify a string of text of a stored electronic book that matches the text string of machine encoded text and based on the identifying, can perform outputting of one or more communication.

Figure 2:
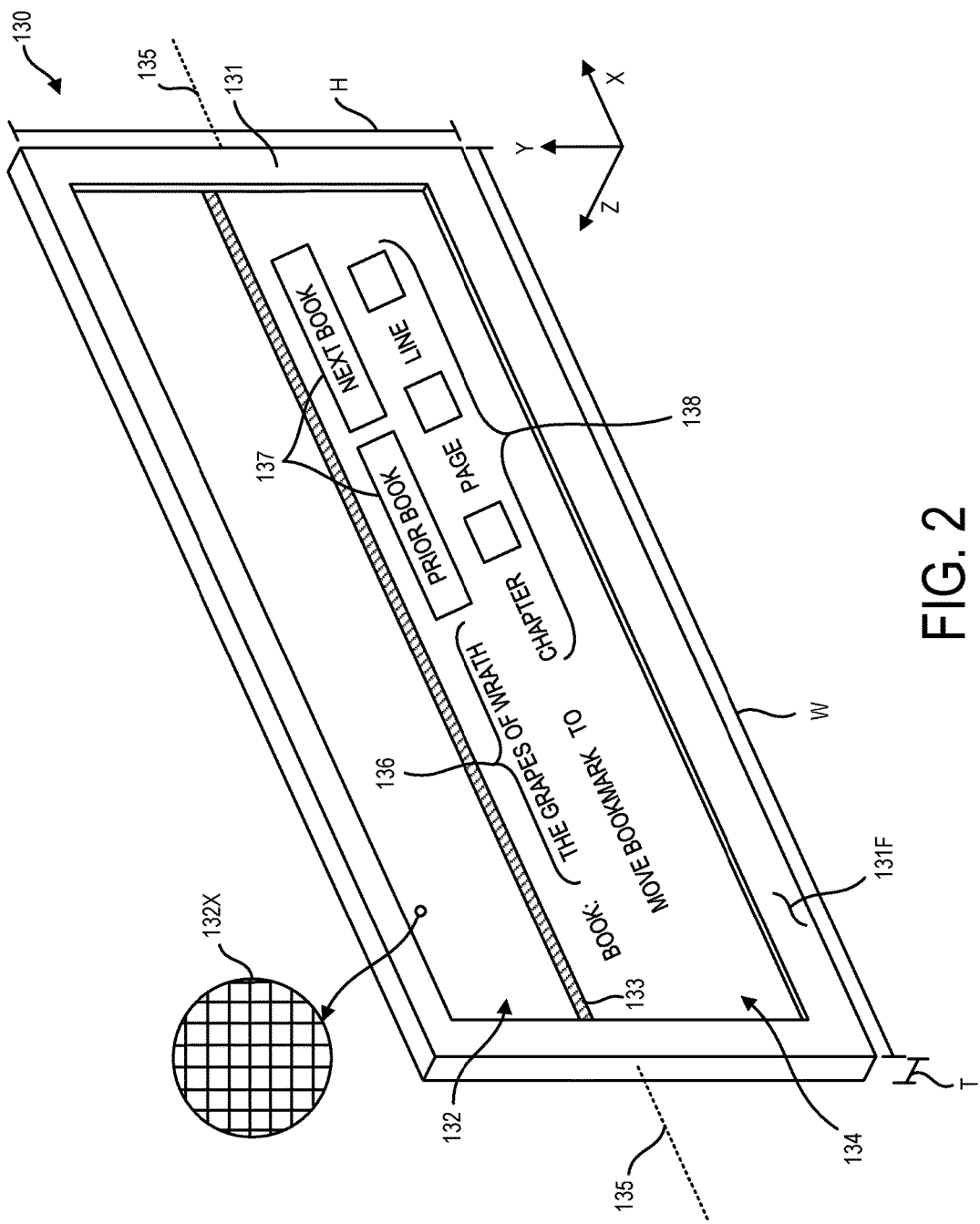
FIG. 2 is a perspective view of a bookmark device in one embodiment.

Manager system 110, electronic book reading device 120, and bookmark device 130 can be in communication with one another via network 160. A front perspective physical view of bookmark device 130 in one embodiment is shown in FIG. 2. In one embodiment bookmark device 130 can be thin and plainer e.g. can have dimensions corresponding to dimensions and form of a traditional bookmark. Bookmark device 130 can have a uniform thickness "T", where "T" in one embodiment is about 2.0 centimeters or less, where "T" in one embodiment is about 1.5 centimeters or less, where "T" in one embodiment is about 1.0 centimeters or less, where "T" in one embodiment is about 0.50 centimeters or less, where "T" in one embodiment is about 0.30 centimeters or less, where "T" in one embodiment is about 0.30 centimeters or less, where "T" in one embodiment is about 0.20 centimeters or less, where "T" in one embodiment is about 0.10 centimeters or less, where "T" in one embodiment is about 0.05 centimeters or less. In one embodiment, bookmark device 130 can have a width "W" that is longer than a height "H." In use, bookmark device 130 can be adapted so that for marking a page on a book bookmark device 130 can be placed generally horizontally with respect to a page, so that longitudinal axis 135 of bookmark device 130 runs parallel to a row of text of page on a physical book 140.

In one embodiment, bookmark device 130 can include width dimension "W" of between about 5.0 centimeters and about 25 centimeters and in one embodiment a width dimension "W" of between about 7.0 centimeters and about 20 centimeters and in one embodiment can include a width dimension "W" of between about 9.0 centimeters and about 18 centimeters. In one embodiment, bookmark device 130 can have height dimension "H" of between about 1.0 centimeter and about 15 centimeters. In one embodiment bookmark device 130 can have a height dimension "H" of between about 1.5 centimeters and about 10 centimeters. In one embodiment, bookmark device 130 can have a height dimension "H" of between about 2.0 centimeters and about 7.0 centimeters. In one embodiment, bookmark device 130 can have a height dimension "H" of between about 3.0 centimeters and about 6.0 centimeters. In one embodiment, bookmark device 130 can have a thickness dimension "T" of uniform thickness of about 0.2 centimeters or less. In one embodiment, bookmark device 130 can have a thickness dimension "T" of uniform thickness of about 0.50 centimeters or less. In one embodiment, bookmark device 130 can have a thickness dimension "T" of uniform thickness of about 0.30 centimeters or less. In one embodiment, bookmark device 130 can have a thickness dimension "T" of uniform thickness of about 0.20 centimeters or less. In one embodiment, bookmark device 130 can have a thickness dimension "T" of uniform thickness of about 0.10 centimeters or less. In one embodiment, bookmark device 130 can have a thickness dimension "T" of uniform thickness of about 0.05 centimeters or less. In one embodiment, bookmark device 130 can be generally rectangular as shown in FIG. 2 and include a uniform thin thickness so that bookmark device 130 has the form factor of generally corresponding to the form factor of a traditional analog bookmark. FIG. 2 shows a front perspective view of bookmark device 130 in use. In general, in use in order to mark a page on a book, bookmark device 130 can be face down on a page so that the front face of bookmark device 130 as shown in FIG. 2 is abutted against a page of a book.

Bookmark device 130 can be operative so that performing of physical bookmarking of a physical book 140 with bookmark device 130 triggers character recognition processing of image data representing content of a page of a book being marked. Character recognition processing can be responsive to physical bookmarking performed using bookmark device 130. In one embodiment, bookmark device 130 can include a housing 131 that supports various electronic components for providing one or more of e.g. imaging functionality for use in obtaining image data by collecting image data representing content of a book and display functionality for displaying information to users. For example, referring to FIG. 2 bookmark device 130 can include an imaging area 132 for providing imaging functionality allowing bookmark device 130 to obtain image data by collecting image data representing content in the physical book. For example, in imaging area 132 throughout an entirety thereof there can be disposed an M×N image sensor pixel array having a plurality of light-sensitive pixels as indicated in the exploded view area 132× of FIG. 2. In one embodiment, such image sensor pixel array can be distributed throughout area 132 and can extend substantially the elongated width dimension "W" as shown in FIG. 2 of bookmark device 130. An M×N image sensor pixel array can be disposed in association with suitable optics so that bookmark device 130 is configured to obtain image data by collecting image data representing text formed on a page of physical book 140 under various condition including when bookmark device 130 is placed in close proximity to physical book 140, e.g. disposed in face down contacting relation to physical book 140.

Bookmark device 130 can include display area 134 defined by a display also extending substantially the extent of the width dimension "W" of bookmark device 130. In one embodiment, imaging area 132 in which light sensitive pixels can be distributed and display area 134 in which a display can extend 80% of a width of bookmark device 130 and in one embodiment, 90% or greater. In use, bookmark device 130 can be collecting image data representing content of a page of a physical book 140 when bookmark device 130 is placed face down on a page of the book. In one embodiment, bookmark device 130 can be placed down on a book so that longitudinal axis 135 extending through a longer dimension of bookmark device 130 runs parallel with a row of text of physical book 140. Bookmark device 130 can be operative so that bookmark device 130 can be collecting image data representing content of a page of physical book 140 that is opposed by imaging area 132 when bookmark device 130 is placed face down on a page of a physical book 140. Imaging area 132 in one embodiment can include an elongated rectangular shape as shown. When bookmark device 130 is placed face down so that imaging area 132 runs horizontally coextensively with a row of text, image data representing that row of text can be collected by bookmark device 130. Imaging area 132 can have a height sufficient to that imaging area 132 can be used to image a row of text of common font size, e.g. 8 to 16 point font. In one embodiment, imaging area 132 can have a height that is between about 80 cent and about 10 cent of a height "H" of bookmark device 130. In one embodiment, imaging area 132 can have a height that is between about 60 cent and about 20 cent of a height "H" of bookmark device 130. In one embodiment, imaging area 132 can have a height that is between about 50 cent and about 30 cent of a height "H" of bookmark device 130. Each of imaging area 132 and display area 134 can have an elongated width dimension longer than a height dimension.

Display area 134 defined by an electronic display, displays useful information e.g. a title (e.g. in area 136) chapter, page, and text row (e.g. in area 138) of a physical book 140 that has been subject to physical bookmarking using bookmark device 130 or a chapter, page, and line of an electronic book corresponding to a physical book being read that has been subject to digital bookmarking in response to user defined data input by a user with use of a manually operated user interface. Display area 134 can include controls such as toggle buttons 137 that allow a user to view information (e.g. current bookmark states) of other books of a user stored in data repository 112. In one embodiment, display area 134 can have a height that is between about 80 cent and about 10 cent of a height "H" of bookmark device 130. In one embodiment, display area 134 can have a height that is between about 60 cent and about 20 cent of a height "H" of bookmark device 130. In one embodiment, display area 134 can have a height that is between about 50 cent and about 30 cent of a height "H" of bookmark device 130.

Figure 3:
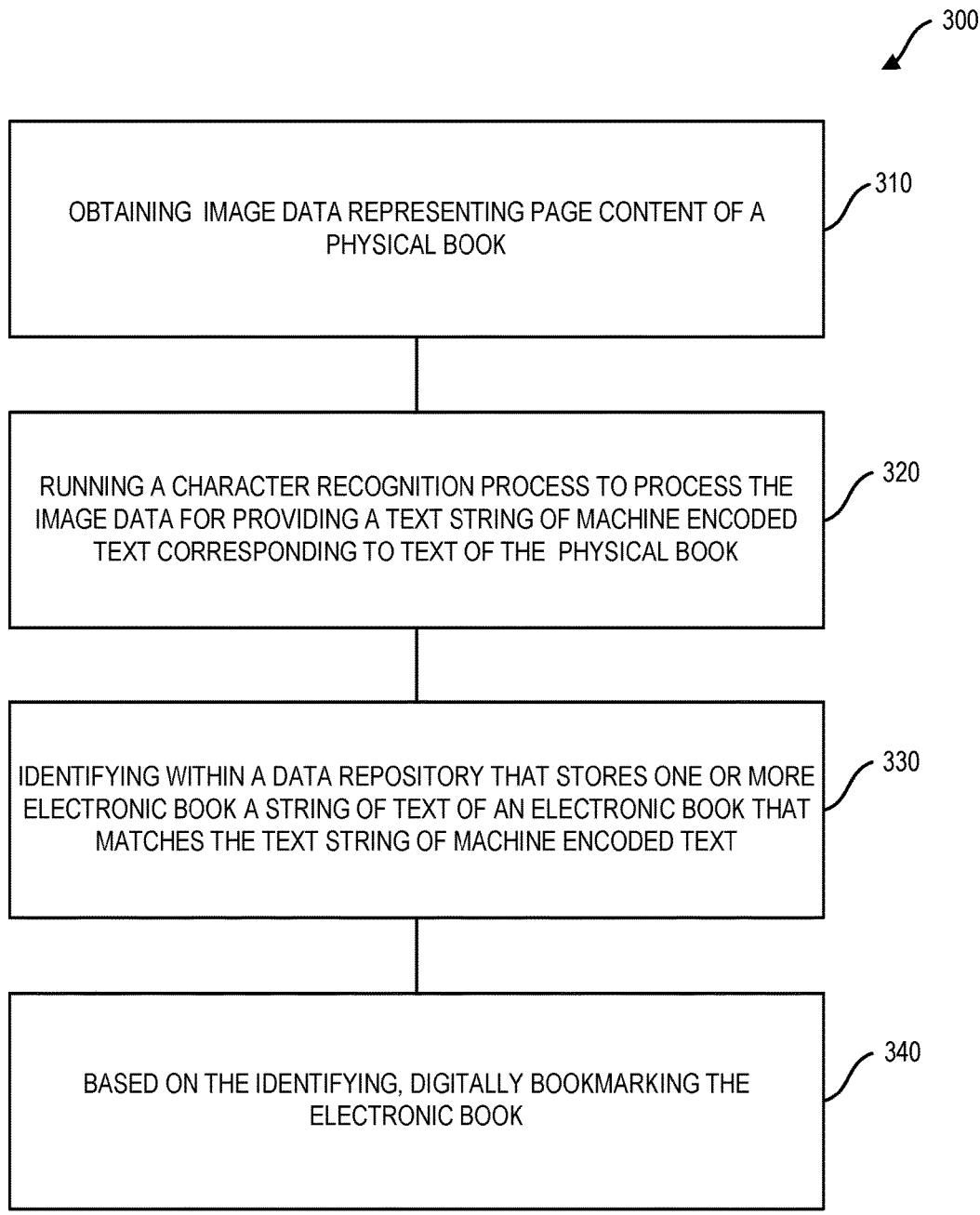
FIG. 3 is a flowchart illustrating method for use in bookmark synchronization one embodiment.

A method for performance by system 100 is illustrated in reference to the flowchart of FIG. 3. At block 310, system 100 can perform obtaining image data representing page content of a physical book. At block 320, system 100 can perform running a character recognition process to process the image data for providing a text string of machine encoded text corresponding to text of the physical book. At block 330 system 100 can perform identifying within a data repository that stores one or more electronic book a string of text of an electronic book that matches the text string of machine encoded text. At block 340, system 100 can perform based on the identifying, digitally bookmarking the electronic book. In one embodiment, the functions of blocks 310, 320, 330, and 340 can be performed by manager system 100 as set forth herein, which manager system 110 in various embodiments can be collocated with another system e.g. electronic book reading device 120 or bookmark device 130 or which can be external to electronic book reading device 120 and bookmark device 130. The flowchart of FIG. 4 illustrating an embodiment of method 300 set forth in FIG. 3 being performed.

Figure 4:
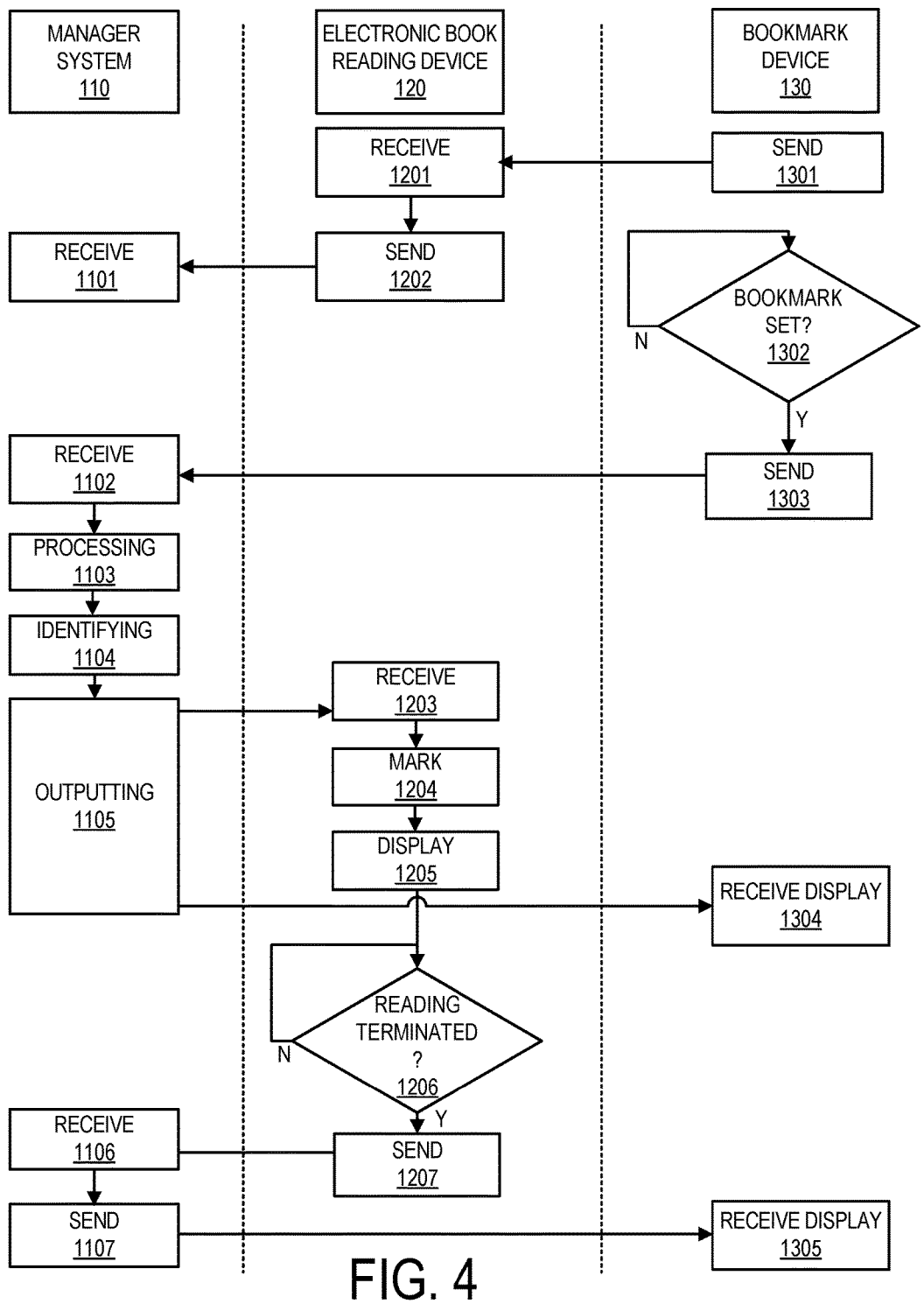
FIG. 4 is a flowchart illustrating method for use in bookmark synchronization one embodiment.

FIG. 4 illustrates performance of method 300 according to one embodiment. In FIG. 4 a flowchart illustrating a method performed from the perspective manager system 110, electronic book reading device 120, and bookmark device 130 is described herein.

At block 1301, bookmark device 130 can send a request to associate itself with electronic book reading device 120 for receipt by electronic book reading device 120 at block 1201. In one embodiment, bookmark device 130 and electronic book reading device 120 can each be configured to communicate by way of a short range radio transmission protocol e.g. each can have a Bluetooth network communication interface. In one embodiment, sending at block 1301 can be in the form of a communication to pair bookmark device 130 and electronic book reading device 120 as paired devices of a Bluetooth network. At block 1201, electronic book reading device 120 can complete a pairing. By pairing of bookmark device 130 and electronic book reading device 120, bookmark device 130 can be logically associated to electronic book reading device 120, so that data generated using bookmark device 130 can be associated to data generated using electronic book reading device 120. At block 1202, electronic book reading device 120 can send association data to manager system 110 for receipt by manager system 110 at block 1101. The association data can specify that electronic book reading device 120 and bookmark device 130 are associated to one another.

Electronic book reading device 120, in one embodiment can have previously been associated to a certain user. Manager system 110, as set forth in reference to FIG. 1 can include various data that associates electronic book reading devices 120 of system 100 and bookmark devices 130 of system 100. For example, data repository 112 can include user ID to electronic book reading device table 2201 that associates user identifiers to their respective electronic book reading devices, and user ID to bookmark device table 2202 that associates user identifiers to their respective bookmark devices. Thus, table 2201 and 2202 can be indexed and cross referenced to one another by a user identifier "user ID" specified as "UID" in FIG. 1. Data repository 112 can also include electronic book reading device to bookmark device table 2205 which can associate specific electronic book reading devices of system 100 to bookmark devices of system 100 independent of any user identification. Manager system 110 can look up a current association between an electronic book reading device 120 and a bookmark device 130 using tables 2201 and 2202 or table 2205.

Data repository 112 can include a user ID to electronic books table 2203 that associates user identifiers to electronic books that they have owned and which are stored in an area of data repository 112. Data repository 112 can have area 2204 that stores a plurality of electronic books. Each user of system 100 can register to become a registered user of manager system 110 and can purchase electronic books. By purchasing additional electronic books, a user can gain access to additional content of electronic books area 2204. Any number of processes can be employed to associate a certain electronic book reading device with a certain bookmark device to facilitate system 100 associating data obtained using a certain bookmark device 130 with a certain electronic book reading device 120. As noted in reference to FIG. 1, a certain electronic book reading device 120 and certain bookmark device 130 can be associated to one another by sharing a common user identifier. Although a short-range radio communication network can be used to facilitate pairing and therefore association between a bookmark device 130 and electronic book reading device 120 need not rely on pairing over a short-range radio communication network.

Figure 5:
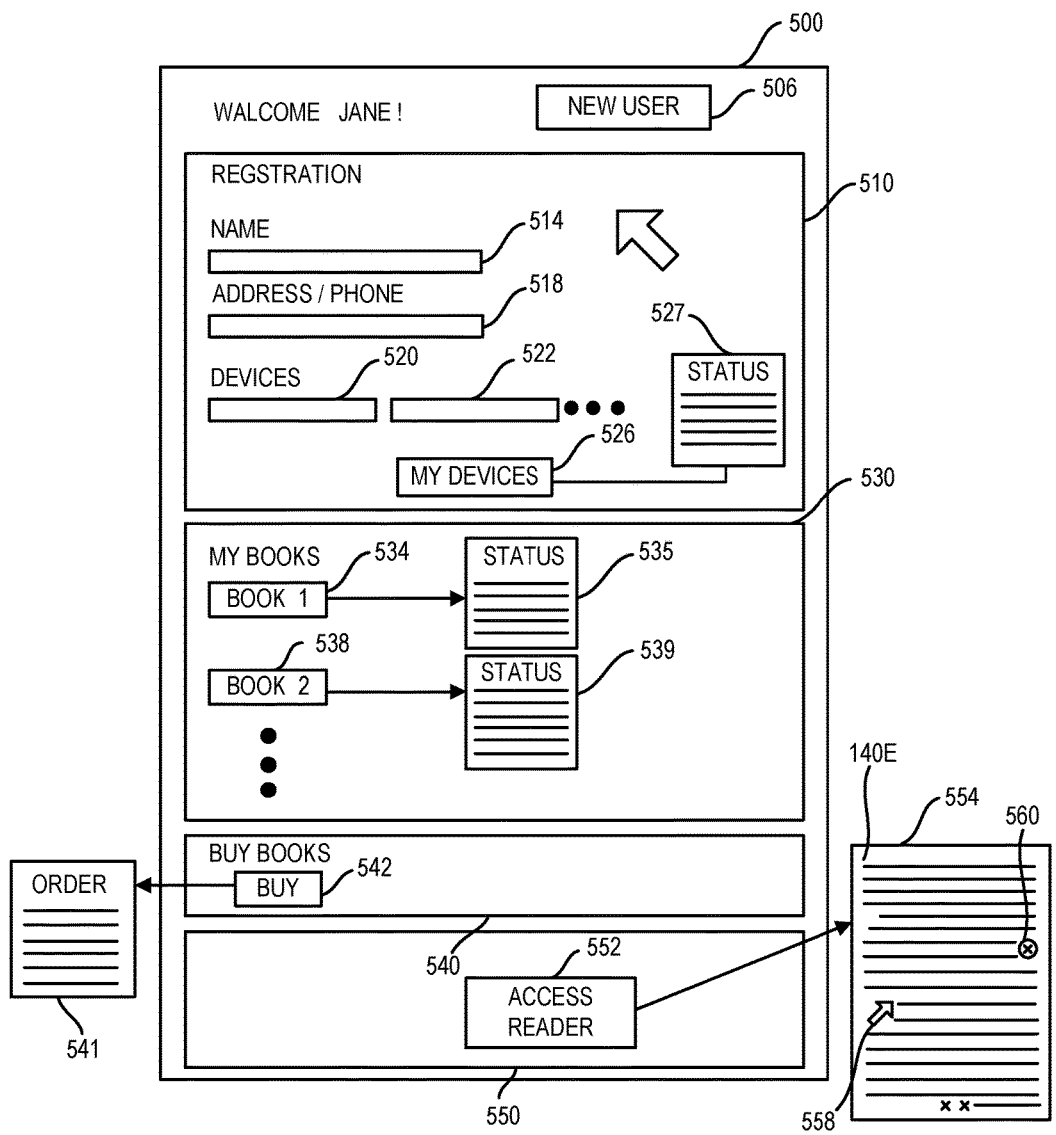
FIG. 5 depicts a user interface for use in providing various functions including electronic bookmark functions in one embodiment.

FIG. 5 shows a user interface 500 provided by a manually operated user interface that can be used by user to perform various processes e.g. registering the user as a registered user of manager system 110 registering devices such as electronic book reading devices according to electronic book reading device 120 and bookmark devices according to bookmark device 130 into manager system 110 so that such devices are associated to one another and to an identifier for the user performing the registration. User interface 500 can also be used to review various statuses. For example, statuses respecting books purchased, the status of reading progress of various books, and user interface 500 can also be used to purchase additional electronic books and/or physical books. In one embodiment, user interface 500 as shown in FIG. 5 can be displayed on any display of a computer device of a certain user of system 100. For example, user interface 500 can be displayed on a display of electronic book reading device 120, bookmark device 130, of a certain user or any other computer device of a user e.g. on a laptop, smartphone, or tablet of a user.

For display of user interface 500 on a display of bookmark device 130 which may have a display of reduced size, bookmark device 130 can reformat the display in some embodiments in view of a smaller display of bookmark device 130 defined by display area 134 of bookmark device 130 and in one embodiment can provide scrolling options so that additional content can be viewed by activating scrolling where display is restricted by display area size.

Referring to user interface 500, the user can activate button 506 to initiate a registration process if the user is a previously unregistered user. The user can use area 510 to register himself/herself as a new user into manager system 110. User can use area 514 to enter name information, area 518 to enter address and phone information, and areas 520 and additional areas 522 to enter information on devices to be registered such as electronic books or bookmark devices of the user. Address information entered in area 518 can include physical address information and/or digital address information e.g. can include information such as email address information and social media contact information. For example, in one embodiment a user can type in serial numbers for electronic book reading devices or bookmark devices into areas 520 and 522 which can be formed on the housings of such electronic devices. Serial numbers for electronic devices such as electronic book reading devices and bookmark devices, can be auto-populated into areas 520 and 522 e.g. where the electronic devices to be registered are configured to automatically stream identifying data on access to user interface 500 which can be configured as an accessible served on a website server of manager system 110. Using button 526, a user can be presented with a status display 527 indicating a status of all devices registered to the current user. Regarding area 530, a user can use area 530 to view statuses of various books that have been purchased by a user. For example, by activating button 534 a user can be presented with the status of "BOOK 1", in status area 535 and by activating button 538, the user can be presented with the status of "BOOK 2" in area 539. The status areas 535 and 539 can include a variety of information including information on the current reading status of the book i.e. the point in the book to which the user has last read. System 100 is able to track the reading progress of any book whether the reading progress is made by reading of the physical book 140 or the counterpart electronic book stored in electronic books area 2204 of data repository 112. A user can use area 540 to purchase new books. For example by activating buy button 542 a user can be presented with order window 541 permitting the user to specify various purchase orders for new electronic books and/or new physical books.

Reference is now made again to the flowchart of FIG. 4. With bookmark device 130 and electronic book reading device 120 properly associated to a user the user can endeavor to read a physical book. During reading by a user of a physical book, bookmark device 130 can iteratively perform block 1302 to iteratively determine whether a bookmark has been set by the user using bookmark device 130 to perform physical bookmarking. In one embodiment, a bookmark device 130 is set according to a physical bookmarking performed by a user when placed in contact, face down, with a page of physical book 140. A physical bookmarking of a physical book 140 using bookmark device 130 can include e.g. a bookmark set and in one embodiment can be completed by a closing of a physical book 140 onto a bookmark device 130.

Bookmark device 130 of system 100 can be operative to determine that a bookmark device 130 has been set according to a physical bookmarking using a variety of technologies e.g. by processing image data collected using imaging components of imaging area 132 as set forth in reference to FIG. 2. In one embodiment, bookmark device 130 can be configured so that image data collected with use of bookmark device 130 is in focus when bookmark device 130 is contacted face down on a page of a physical book having text. Thus, bookmark device 130 can determine that bookmark device 130 has been set by monitoring a focus attribute of collected image data. Bookmark device 130 in addition or alternatively for detecting the bookmark set condition can examine e.g. data output by one or more contact sensor and/or a flag status indicator raised by manual activation of a user interface component e.g. a button on bookmark device 130 by a user.

Figure 6:
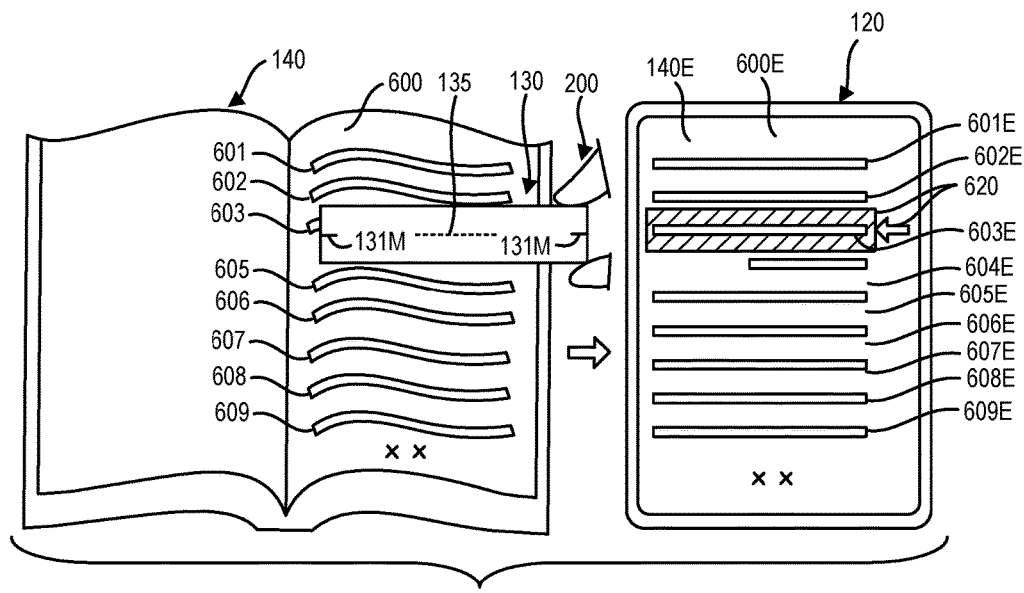
FIG. 6 illustrates a digital bookmarking process synchronized to a physical bookmarking process according to one embodiment.
Figure 7:
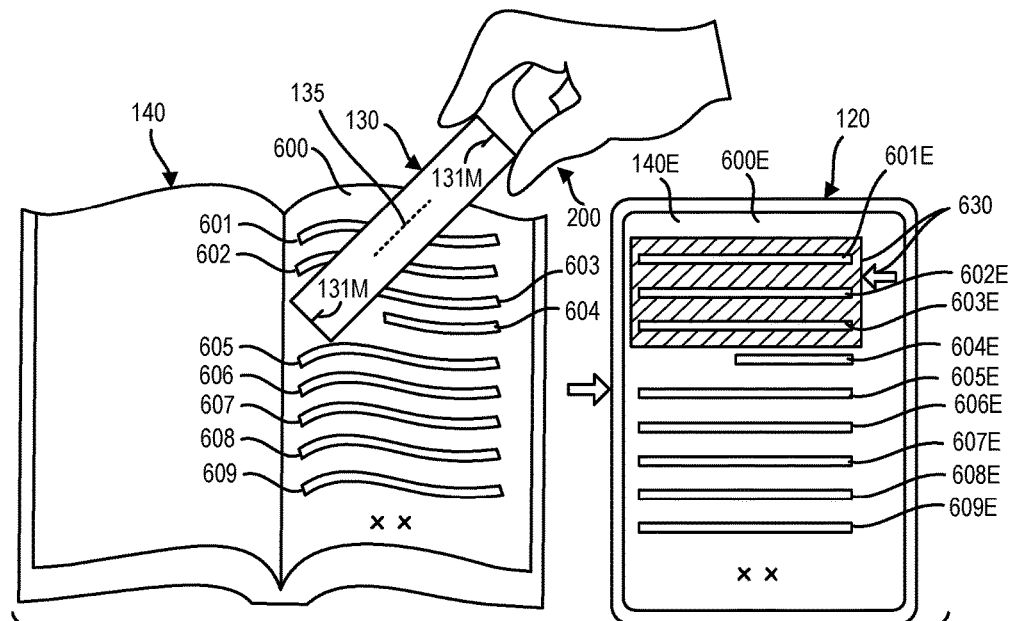
FIG. 7 illustrates a digital bookmarking process synchronized to a physical bookmarking process according to one embodiment.

In one embodiment, bookmark device 130 can be provided with associated literature e.g. online provided literature, instruction literature displayed on display area 134, pamphlet literature describing use of bookmark device 130. In one embodiment, bookmark device 130 can be used to collect image data represented text characters of a row of text of a page in a physical book. For such use, a use of bookmark device 130 can include contacting bookmark device 130 in face down contact with the page of a physical book 140 in a manner so that longitudinal axis 135 of bookmark device 130 runs parallel to the row of text of a book in a manner to that imaging area 132 opposes, covers, and is over an area of a row of text desired to be subject to imaging. Bookmark device 130 can be provided with alignment aids 131M as shown in FIGS. 6 and 7 e.g. permanently formed on housing 131 to guide a user in properly placing bookmark device 130 on a page of a book to optimize imaging of text from a page such as content of certain row of text from a page. In such manner, bookmark device 130 can be well adapted to be used to selectively collect image data representing content of a certain targeted row of physical page formed text e.g. an entire row of text or a partial row of text. In one embodiment, bookmark device 130 can be used to collect image data selectively representing content of a certain row of a physical book page to the exclusion of remaining rows of the book page. By the inclusion of various features such as imaging functionality being operative when bookmark device 130 is in contact with a physical book page bookmark device 130 can be configured so that bookmark device 130 can be used by user to select a specific row of text of a page to be subject to imaging and further processing (e.g. OCR processing) out of a plurality of candidate rows of text of a page. Thus, bookmark device 130 can be used to set a specific location bookmark e.g. text row specific bookmark alleviating an otherwise presented need of a user to mentally scan a multi-row section of text to attempt to recapture a stopping point.

System 100 can be configured so that a user can perform physical bookmarking of a physical book 140 using bookmark device 130 in a variety of different ways. FIGS. 6 and 7 illustrate bookmark device 130 in use to physically bookmark a physical book 140 having a physical page 600, wherein the physical page 600 includes a plurality of rows of text 601-609. FIG. 6 illustrates the use case where a user 200 performs physical bookmarking to selectively bookmark a particular row of a physical page 600. FIG. 7 illustrates the use case where a user 200 performs physical bookmarking to generally select a page to bookmark without selective selection of a certain row of text of a physical page.

Referring to the use case of FIG. 6 physical book page 600 includes formed rows of text 601-609 and bookmark device 130 is shown as being used, e.g., by proper alignment of alignment aids 131M so that imaging area 132 (facing the page in the view of FIG. 6 and not shown) opposes a targeted row of text. In the use case depicted in FIG. 6 a user has oriented bookmark device 130 horizontally so that longitudinal axis 135 of bookmark device 130 runs parallel with rows of text 601-609. System 100 can be operative to determine an orientation of bookmark device 130 based on a detected direction of text represented in collected image data. In some cases an imaging area 132 can be of such height in relation to a row of text of a physical book 140 that imaging area 132 opposes more than one row of text of a physical book page. System 100 can have user configurable settings so that in such a situation according one configuration setting image data representing a row of text other than a most centered row can be digitally cropped. System 100 can have user configurable settings so that in such a situation according to another configuration setting image data representing multiple rows are selected by the bookmark device setting.

In the example of FIG. 7, physical bookmarking is illustrated wherein bookmark device 130 can be relatively imprecisely placed over multiple rows of text of a physical page 600. In the example of FIG. 7, bookmark device 130 is shown as being positioned so that imaging area 132 (facing the page in the view of FIG. 7 and not shown) opposes portions of rows 601, 602, and 603 of text of physical page 600. Thus image data representing physical page 600 collected using bookmark device 130 can represent portions of rows 601, 602, and 603 of text of physical page 600. System 100 is able to complete bookmark syncing whether physically bookmarking is performed using precise placement of bookmark device 130 as shown in FIG. 6 or imprecise placement of bookmark device 130 as shown in FIG. 7.

A physical bookmarking using bookmark device 130 in one embodiment can include a bookmark set and can be completed in one embodiment by closing a physical book 140 on a bookmark device 130. Embodiments herein recognize that system 100 in some use cases can detect more than one bookmark set during the course of a physical bookmarking. For example a user after performing a precision bookmark set as depicted in FIG. 6 can casually rest bookmark device 130 on a book in an imprecise position as shown in FIG. 7 in which case another bookmark set condition can be detected. Subsequently, another set condition can be detected when closing a physical book 140 on bookmark device 130 to complete a physical bookmarking. System 100 can be configured to apply rules based criteria to discriminate between bookmark sets to determine sections of a page intended to be subject to bookmarking by a user. In one embodiment bookmark device 130 can include a motion sensor e.g. an accelerometer. System 100 can be operative so that ceasing of motion after a motion period of bookmark device 130 establishes a valid time window for tracking bookmark sets for a physical bookmarking. System 100 can be operative so that an initial bookmark set detected during a valid time window for a physical bookmarking is used for digital bookmarking synchronization unless criteria are satisfied. Such criteria can include e.g. that a subsequent bookmark set indicates a higher level of precision (e.g. indicates horizontal or vertical orientation where a prior set indicates diagonal orientation) and/or that a subsequent bookmark set is set with respect to a different page.

In one embodiment, imaging area 132 and display area 134 can have coplanar front surfaces which coplanar front surfaces can be slightly recessed with respect to a front surface of housing 131. A border structure 133 between imaging area 132 and display area 134 if present can also have a front surface coplanar with a front surface of imaging area 132 and display area 134 and recessed from a planar front surface 131F of housing 131 which front surface 131F can be contacted with a physical book page for performing of physical bookmarking using bookmark device 130. With bookmark device 130 configured as described flood illumination softly emanating from display area 134 can flood an area forward of imaging area 132 to provide sufficient illumination for imaging functionality when bookmark device 130 is contacted face down on a page of a physical book 140 so that a front surface 131F of housing 131 is in contacting relation with a page of a physical book 140.

Referring again to the flowchart of FIG. 4, bookmark device 130 in response to a bookmark set condition being satisfied (e.g. which condition can be detected for by bookmark device 130 monitoring a focus attribute of collected image data) and to trigger character recognition processing can send image data representing content of one or more row of physical page form text formed on a page of physical book 140 to manager system 110 for receipt by manager system 110 at block 1102. Manager system 110 at block 1102 can perform obtaining of image data by receiving image data from bookmark device 130 which in one embodiment can be external to bookmark device 130. At block 1103, responsively to receipt of the image data at block 1102 manager system 110 can perform processing of the received image data. Processing at block 1103 can include e.g. optical character recognition (OCR) processing to convert image representations of text characters into machine readable and machine-encoded text characters.

In one embodiment, as set forth in reference to FIG. 1 manager system 110 can run an optical character recognition (OCR) process. Running OCR process 114, manager system 110 can perform electronic conversion of images of typed, handwritten, or printed text to machine-encoded text. OCR process 114 can incorporate various technologies of pattern recognition, artificial intelligence, and computer vision. OCR process 114 can include performance of various pre-processing processes such as deskewing, despeckling, binarization, line removal, and character segmentation. By running of OCR process 114 various character recognition technologies can be used e.g. pattern recognition and/or image correlation. Feature extraction can be performed to decompose glyphs into features such as lines, closed loops, line direction, and line intersections. Nearest neighbor classifiers such as the k-nearest neighbors (KNN) algorithm can be used to compare image features and stored glyph features and for selection of a nearest match. Running OCR process 114 can include various post-processing processes, such as processes to increase accuracy with a machine-encoded text string obtained at block 1103.

Manager system 110 can perform at block 1104 identifying of a text string of an electronic book that matches the machine encoded text string provided at block 1103 that corresponds to content of one or more row of text of physical book 140. Manager system 110 for performing such identifying can perform matching of a text string of an electronic book to machine encoded text string based on a matching criteria. Matching criteria can permit matching based on a probability of a correct identification exceeding a threshold. In some cases a machine encoded text string can include missing characters that can be expressed as wildcard characters for performance of matching. For example according to the physical bookmarking explained with reference to FIG. 7, image data representing a physical page 600 of a physical book 140 book can include partial representations of multiple rows of text. For the sections of the rows not represented with obtained image data manager system 110 can provide wildcard characters. Manager system 110 can iteratively vary a number of wildcard characters provided between machine encoded text characters positively encoded within a valid range (determined e.g. based on font sizes represented in obtained image data) until identifying of a text string of an electronic book is successful. For performance of block 1104 manager system 110 can search content of electronic books in area 2204 of data repository 112 that are associated to the current user. Embodiments herein recognize that a string of machine encoded text corresponding to text row of a physical book 140 can provide a de facto identifier for a book being read which can be used to discriminate which electronic book out of a set of candidate electronic books the row of text is located. Embodiments herein recognize that it may be unlikely that a row of text in a book is repeated in its precise form from book to book. Thus, to perform identifying at block 1104 manager system 110 need not have a priori knowledge of the physical book 140 subject to a bookmark set by way of physical bookmarking performed by the user at block 1302. Rather, the particular physical book 140 out of a plurality of candidate physical books that might be subject to a bookmark set by a user at block 1302 by physical bookmarking can be automatically discriminated by manager system 110 by performing of identifying at block 1104. The machine encoded string of text characters generated by activation of OCR process 114 can serve as an identification of the physical book 140 subject to a bookmark set by a user at block 1302. In one embodiment, electronics book area 2204 of data repository 112 can include multiple versions of the same physical book 140, e.g. can include different published editions of physical book 140. Manager system 110 can be configured to select the correct electronic book version matching the pagination and formatting of physical book 140. For example, in one embodiment, manager system 110 can select a version of an electronic book according to a purchase order of a physical book performed by a user using user interface 500. Alternatively or in addition manager system 110 e.g. during running of OCR process 114 can determine font, font size, and/or page layout information of physical book 140 and can use the determined information for selecting a correct version of an electronic book matching physical book 140.

Referring again to the flowchart of FIG. 4, manager system 110 at block 1105 can perform outputting of one or more communication. Outputting at block 1105 can include outputting of a plurality of communications. In one example, outputting can include outputting a communication to digitally bookmark an electronic book so that on display of the electronic book, a digital bookmark is displayed indicating the location of the electronic book corresponding to the location of physical book 140 subject to a bookmark set at block 1302 performed as part of physical bookmarking performed by a user. The digital bookmarking can be specific, e.g. can be performed to digitally bookmark a specific row of text of a specific page of an electronic book corresponding to physical book 140 where a specific row of text of physical book 140 has been subject to physical bookmarking. For example, as explained with reference to block 1302 and FIG. 6 a certain row of text of a physical book 140 can be subject to a bookmark set by a user. In the outputting of a communication to digitally bookmark content of an electronic book, manager system 110 can output a communication to digitally reformat an electronic book so that image data for display on display of the electronic book displays a digital bookmark to highlighting the certain row of an electronic row of an electronic book corresponding to the certain row of text of a physical book 140. Digital reformatting of an electronic book can be responsive to bookmark set at block 1302. There is set forth herein a method including digitally bookmarking an electronic book, wherein the digitally bookmarking is synchronized to a physical bookmarking so that a digital bookmark of the electronic book is provided at a location of the electronic book corresponding to a location of the physical book 140 that is bookmarked by the physical bookmarking. The location of the electronic book subject to digital bookmarking can include e.g. a location provided by a page of the electronic book, a location provided by a set of text rows of a page of the electronic book, and/or a location provided by a certain text row of a page of the electronic book. The method can include outputting for display on a display of the bookmark device 130 a text based message having location information indicating the location of the physical book 140 that is bookmarked by the physical bookmarking.

Referring to output at block 1105, in response to outputting a communication at block 1105 to digitally bookmark the section of an electronic book, electronic book reading device 120 at block 1203 can receive the communication and can responsively digitally bookmark the proper location of the electronic book at block 1204 so that on display of the electronic book of block 1205 the display of an electronic book includes an indicator provided by a digital bookmark indicating a location of the electronic book corresponding to the location of physical book 140 subject to a bookmark set at block 1302 by way of physical bookmarking. It will be understood in some instances digital bookmarking at block 1204 can occur prior to performance of display at block 1205. For example, in one embodiment at blocks 1303, 1102, 1103, 1104, 1105, 1203, and 1204 can occur automatically and responsively to one another and can occur in real time without delay other than processing delay which can be imperceptible to a user. However, display at block 1205 can occur some time after digital bookmarking at block 1204 e.g. in the case electronic book reading device 120 powers up some time after setting a bookmark performed as part of a physical bookmarking is detected at block 1302.

FIGS. 6 and 7 illustrate different formats for digital bookmark. In FIG. 6 there is shown a electronic book reading device 120 displaying a digital bookmark 620 in response to the physical bookmarking depicted in FIG. 6. Referring to FIG. 6, physical bookmarking using bookmark device 130 is depicted as involving precise placement of bookmark device 130 to so that an imaging area 132 of bookmark device 130 opposes a certain row of text. Accordingly manager system 110 at block 1105 can output a communication to digitally bookmark an electronic book to result in a displayed digital bookmark 620 as shown in FIG. 6. Referring to FIG. 6, displayable content of electronic book 140E corresponding to physical book 140 is displayed on a display of an electronic book reading device 120. Electronic book reading device 120 can display on a display thereof electronic page 600E corresponding to the physical page 600 subject to physical bookmarking. Displayed electronic page 600E can include displayed digital rows of text 601E-609E corresponding to physical rows of text 601-609. On electronic page 600E there can be displayed a digital bookmark 620 that indicated the specific section of physical book 140 subject to bookmark. In that the physical bookmarking depicted in FIG. 6 include selection of a specific row of text displayed digital bookmark 620 as depicted in FIG. 6 can highlight a certain row of text to the exclusion of remaining rows of text. Digital bookmark 620 can highlight digital text row 603E corresponding to physical page text row 603 selected by physical bookmarking.

Referring to FIG. 7, physical bookmarking using bookmark device 130 is depicted as involving imprecise placement of bookmark device 130 to so that an imaging area 132 of bookmark device 130 opposes row portions of multiple rows of text of physical page 600. Accordingly manager system 110 at block 1105 can output a communication to digitally bookmark an electronic book to result in a displayed digital bookmark 630 as shown in FIG. 7. Referring to FIG. 7, displayable content of electronic book 140E corresponding to physical book 140 is displayed on a display of an electronic book reading device 120. Electronic book reading device 120 can display on a display thereof electronic page 600E corresponding to the physical page 600 subject to physical bookmarking. Displayed electronic page 600E can include displayed digital rows of text 601E-609E corresponding to physical rows of text 601-609. On electronic page 600E there can be displayed a digital bookmark 630 that indicates the section of physical book 140 subject to bookmark. In that the physical bookmarking depicted in FIG. 7 includes selection of multiple rows of text, displayed digital bookmark 630 as depicted in FIG. 7 can highlight multiple rows of text to the exclusion of remaining rows of text. Digital bookmark 630 can highlight digital text rows 601E-603E corresponding to physical page text rows 601-603 selected by physical bookmarking.

Further to the outputting at block 1105, manager system 110 can perform outputting of a communication to digitally bookmark another copy of the electronic book subject to marking at block 1204. For example, the digital bookmarking at block 1204 can occur with respect to a local copy of an electronic book of the current user that is currently stored on electronic book reading device 120 and outputting at block 1105 can include outputting of a communication to digitally bookmark a master copy of the electronic book stored in data repository 112 stored in area 2204 of data repository 112. Further to the outputting at block 1105, outputting can include outputting a communication to bookmark device 130 e.g. for display of information specifying the section of an electronic book determined by manager system 110 to be the section subject to bookmarking by the physical bookmarking action of the user at block 1302. For example, at block 1304 in response to a communication at block 1105, bookmark device 130 can display a book section subject to physical bookmarking at block 1302 as determined by manager system 110, so that the current user of bookmark device 130 can view an indicator of the bookmarking to confirm that the bookmarking was properly conducted. Display area 134 of bookmark device 130 at block 1304 can display such message confirming electronic marking as follows: "THE BOOKMARK WHICH YOU SET WITH YOUR BOOKMARK DEVICE WAS SUCCESFUL. THE COUNTERPART ELECTRONIC BOOK HAS BEEN MARKED WITH A DIGITAL BOOKMARK AT CHAPTER 6, PAGE 37 LINE 5."

Between blocks 1205 and 1206 the current user can be using electronic book reading device 120 to read an electronic book that corresponds to and is the counterpart of physical book 140. For example, the user can commence reading at the section of the current electronic book indicated by the display at block 1205 and can continue to read content from one or more additional electronic book pages thereafter. During this continued reading, electronic book reading device 120 can at block 1206 iteratively determine if reading has been terminated. In one embodiment, determination at block 1205 can include e.g. monitoring for whether a user has selected a power down button or monitoring to determine whether an inactivity condition has been satisfied for automatic shutdown. In one embodiment, determination of reading termination at block 1206 can include determining whether a particular section of a termination page has been selected by the current user. The termination page can be regarded to be the page of the current electronic book displayed at the time of termination.

In one embodiment, system 100 includes functionality so that a user of an electronic book reading device 120 can specifically select via action of a manually operated user interface a specific section of the termination page a stop reading point. For example, referring to FIG. 5 user interface 500 for display on an electronic book reading device 120 can display electronic book reading device view 554 displaying a displayable portion of electronic book 140E corresponding to physical book 140. When user interface 500 is displayed an electronic book reading device view 554 can be displayed on activation of button 552 of area 550. Regarding electronic book reading device view 554, electronic book reading device view 554 can include a cursor 558 and/or touch screen functionality which permits a user to specifically locate a marker 560 indicating a reading termination point. Cursor 558 and/or touch screen functionality can permit specific placement of marker 560 at a specific section of an electronic page being read, e.g. at a certain row of text. In reference to the example described at FIG. 5, the user can use cursor 558 and/or touchscreen functionality to locate marker 560 at the specific section of a termination page at which the user stopped reading. The marker can be specifically located to include a certain row of text, e.g. a certain selected row out of a plurality of candidate rows within a displayed page having multiple rows of text displayed in one or more paragraphs.

Referring further to the flowchart of FIG. 4, electronic book reading device 120 at block 1207 can send data to manager system 110 for receipt by manager system 110 at block 1106 responsively to the reading termination condition being satisfied. The data being sent at block 1207 can include data that indicates the specific reading stopping point, as specified by a user with movement and specific placement of marker 560 on a manually operated user interface 554 as shown and described in reference to FIG. 5. Based on the received data received at block manager system 110 can perform outputting a communication electronic book reading device 120 to digitally reformat electronic book includes a digital bookmark e.g. having the format as depicted by digital bookmark 620 (FIG. 6). Digital reformatting of an electronic book can be responsive to the received data receive at block 1106 so that the digital bookmark is located at a location of the marker 560 depicted in FIG. 6. Responsive to such outputting electronic book reading device 120 can perform receiving, marking and displaying of a resulting digital bookmark as described in reference to blocks 1202-1205. Based on the received data received at block manager system 110 can perform outputting a communication digitally bookmark a master copy of a current electronic book stored in data repository.

On receipt of the data at block 1106, manager system 110 can process the data and based on the marker placement of marker 560 specified by user action using manually operated user interface 500 and based on a digital bookmarking performed based on the placement of marker 560 can activate text based message generation process 115 to generate a text based message indicating the reading stopping point e.g. converting the visual marking into a text description of the marking thus, converting the user interface implemented marking of marker 560 by a user into a user friendly text based message. Text based message generation process 115 can examine a display location of marker 560 by a user at chapter 3, page 57 line 8 of an electronic book to generate the user friendly text based message: "AT CHAPTER 3, PAGE 57 LINE 8". Electronic books stored in electronic books area 2204 can include formatting information that specifies display locations associated to text rows for various display formats. Text based message generation process 115 for determining a text row corresponding to a location of a marker 560 marked e.g. with a cursor or finger touch can examine the location of the mark and can look up the correct row of text based on the current display format and the formatting information of the electronic book and can further discern chapter information based on examination of tables of contents information of the formatting information. Text based message generation process 115 can add text strings via table lookup based on a current status of a book reading. For example where at block 1206 a user has terminated an electronic book reading session manager system 110 can locate the text string via table lookup "ELECTRONIC READING WAS STOPPED" to format the combined text based message "ELECTRONIC READING WAS STOPPED AT CHAPTER 10, PAGE 57 LINE 8".

At block 1107 manager system 110 can send such generated text string to bookmark device 130 for receipt by bookmark device 130 at block 1305. Bookmark device 130 at block 1305 responsively to receipt of the text-based message can display the text based message so that the user of bookmark device 130 is made aware of the precise stopping point of reading during the electronic book reading device reading session terminated at block 1206. Thus, at block 1305 bookmark device 130 can display in display area 134 the text based message ELECTRONIC READING WAS STOPPED AT CHAPTER 3, PAGE 57 LINE 8". The user by reading the display area 132 of the bookmark device 130 is thus made aware that when continuing to read physical book 140 corresponding to the electronic book subject to reading session termination at block 1206 the user should advance the pages of the physical book 140 to CHAPTER 3, PAGE 57 LINE 8.

If bookmark device 130 is currently powered on display at block 1305 can be immediate on reception of the message sent at block 1107. In a common use case however, bookmark device 130 may not be powered up. For example, at block 1206 a user may have terminated an electronic book reading device reading session while in a transportation vehicle remote from the user's home at a time when bookmark device 130 is at the user's home and physically located at a certain page within physical book 140. In such a use case, where bookmark device 130 is not powered up on sending of a message at block 1107 for receipt by bookmark device 130 at block 1305 bookmark device 130 can activate display at block 1305 to display a text-based message indicating the reading termination point of the electronic book reading device reading session at block 1206 on power up of bookmark device 130. In one embodiment, bookmark device 130 can be configured to include light sensitive power up functionality so that bookmark device 130 automatically powers up when exposed to sufficient light, as may occur when physical book 140 which may have bookmark device 130 sitting in physical book 140 and physically marking a page thereof is opened to the page being marked by bookmark device 130. Power up herein is used as a relative term as bookmark device 130 can have various levels of power up. For example one level of power up can be characterized by power up to perform all functions including message display, one level of power up can be characterized by power up to perform data receive and storage functions and power up control functions but not display function, one level characterized by power up to perform light sensing and power up control functions but not data receive and storage function and not display function, and so on.

System 100 can be configured so that various aspects of use of bookmark device 130 are in common with use of a traditional analog bookmark. Thus on setting of a bookmark at block 1302 by way of physical bookmarking a user in accordance with traditional bookmark use may leave bookmark device 130 inside of physical book 140 at the bookmarked page. On re-commencing reading of a physical book 140 a user in accordance with traditional bookmark user can initially open the physical book 140 to the physically bookmarked page that is bookmarked with bookmark device 130. However, unlike traditional bookmark use, on reading the displayed text based message of display area 134, a user is given location information (e.g. one or more or page number or text row number) on the correct location of the physical book 140 to advance to so that the reading progress of the physical book 140 is synchronized to the reading progress of the electronic book corresponding to physical book 140.

Certain embodiments herein may offer various technical computing advantages, involving computing advantages to address problems arising in the realm of computer networks such as relating to user interface functionality in support of activity partially performed on line and requiring resources of a network and partially performed off line in a mode not requiring resources of a network. Embodiments herein can include communications with and use of a bookmark device which can be provided as a computing node based device to support reading of content in physical book form and having corresponding content in electronic book form. A bookmark device for sending and receiving communications can include various features, e.g. can be specially sized to be fitted in book in the manner of a traditional bookmark, can include imaging functionality display functionality and wireless communication functionality. Embodiment herein can include use of a data of a bookmark device which can output image data representing content of a page of a physical book, converting image data to a machine encoded text string, matching a machine encoded text string to a string of text of an electronic book, and outputting a notification based on the matching. Embodiments herein can include sending communications to a bookmark device based on input to a manually operated user interface such as based on markings to an electronic book entered with use of a user interface.

Figure 8:
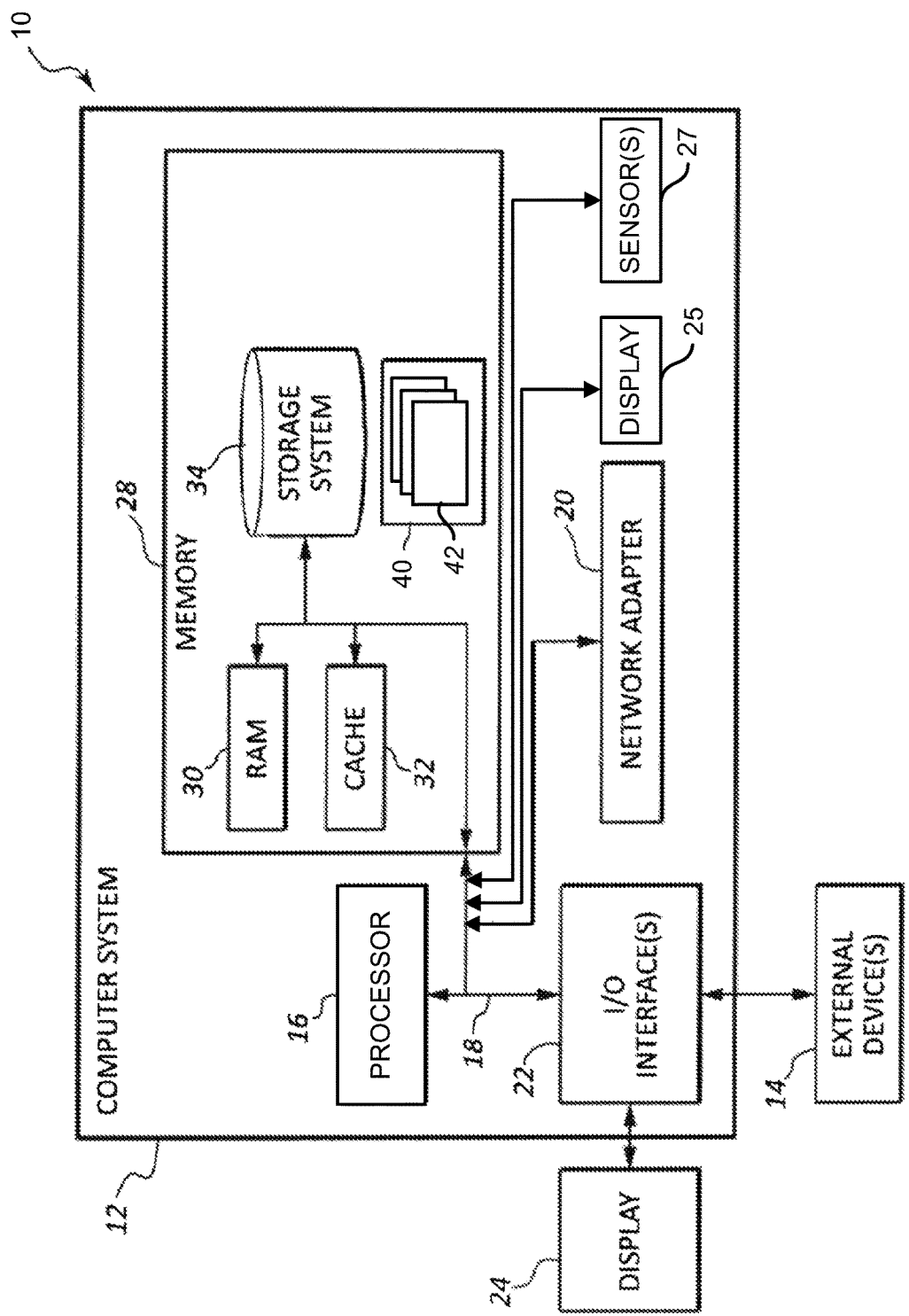
FIG. 8 depicts a computing node according to one embodiment.
Figure 9:
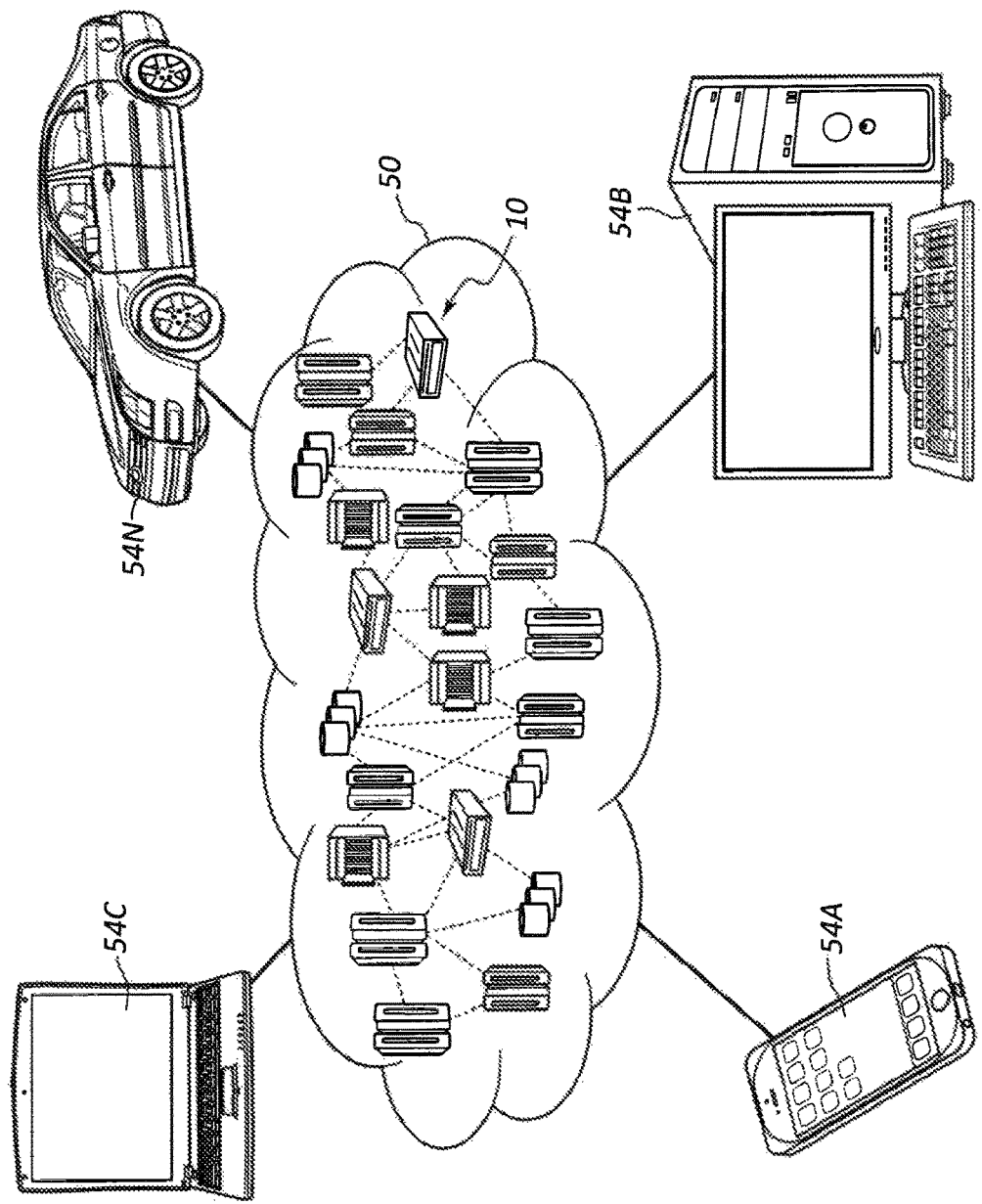
FIG. 9 depicts a cloud computing environment according to one embodiment.
Figure 10:
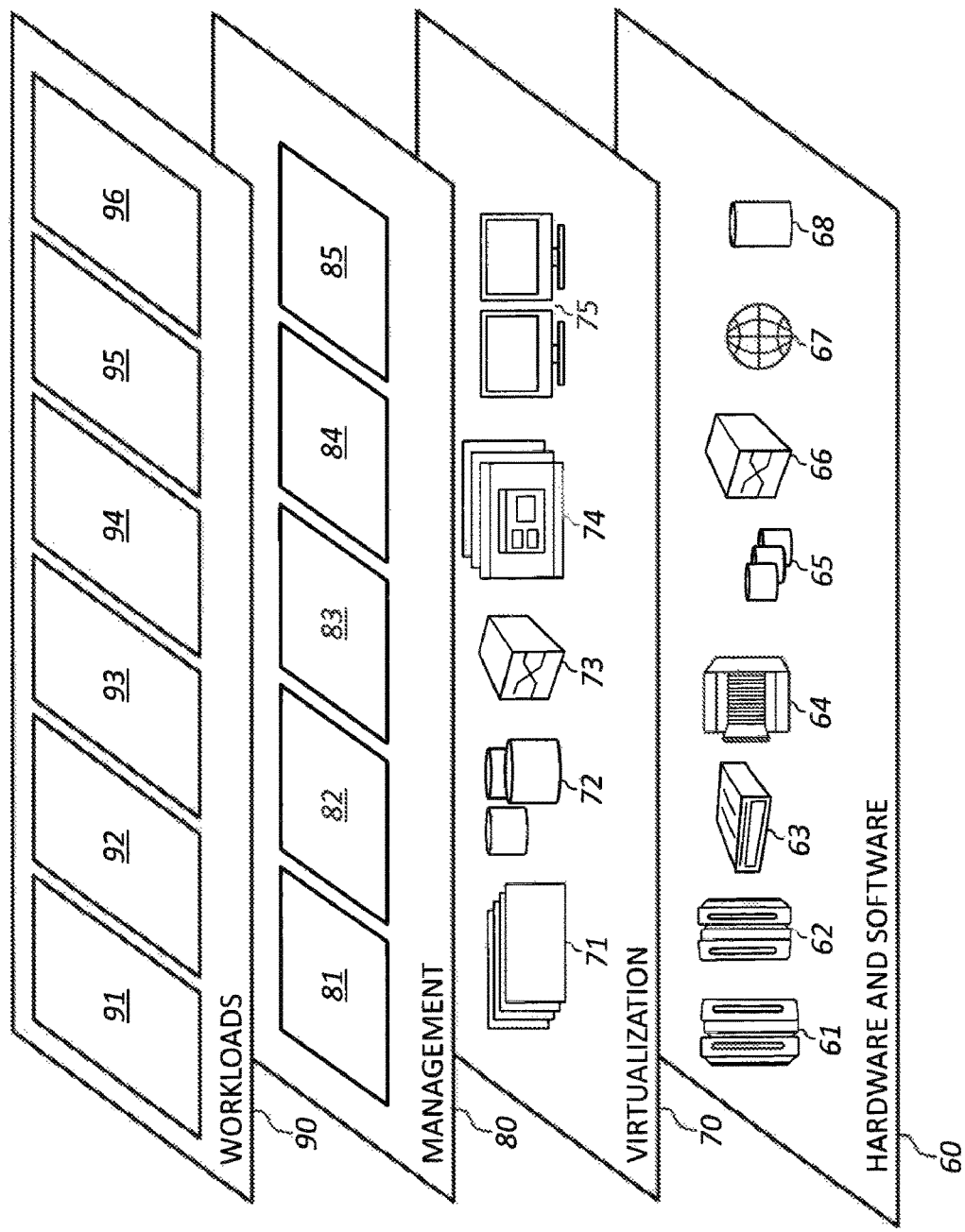
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 300 of FIG. 3, and the functions described with reference to manager system 110 as set forth in the flowchart of FIG. 4. In one embodiment, electronic book reading device 120 can include one or more computing node 10 and can include one or more program 40 for performing functions described with reference to electronic book reading device 120 as set forth in the flowchart of FIG. 4. In one embodiment, bookmark device 130 can include one or more computing node 10 and can include one or more program 40 for performing functions described with reference to bookmark device 130 as set forth in the flowchart of FIG. 4.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for bookmark syncing as described herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining image data representing page content of a physical book, wherein the obtaining image data is responsive to physical bookmarking of the physical book;
   running a character recognition process to process the image data for providing a text string of machine encoded text corresponding to text of the physical book;
   identifying within a data repository that stores one or more electronic book a string of text of an electronic book that matches the text string of machine encoded text; and
   based on the identifying, digitally bookmarking the electronic book, wherein the digitally bookmarking is synchronized to the physical bookmarking so that a digital bookmark of the electronic book is provided at a location of the electronic book corresponding to a location of the physical book that is bookmarked by the physical bookmarking, wherein the obtaining is performed using a bookmark device, wherein the bookmark device is used to perform physical bookmarking of a physical book page of the physical book, wherein the physical bookmarking includes selecting a certain row of text of the physical book page to the exclusion of remaining rows of text of the physical book page, wherein the digitally bookmarking includes highlighting in the electronic book a certain text row of the electronic book corresponding to the certain row of text, and wherein the method includes outputting to the bookmark device for display on a display of the bookmark device a text based message indicating that the certain text row of the electronic book corresponding to the certain row of text of the physical book has been subject to digital bookmarking.

2. The method of claim 1, wherein the physical bookmarking is performed using the bookmark device, wherein the method includes outputting for display on the display of the bookmark device a text based message having location information indicating the location of the physical book that is bookmarked by the physical bookmarking.

3. The method of claim 1, wherein the physical bookmarking is performed using the bookmark device, wherein the method includes displaying a user moveable marker on a manually operated user interface that displays the electronic book, wherein the user movable marker is configured to be moveable to mark a page of the electronic book, and wherein the method includes outputting a text based message for display on the display of the bookmark device, the text based message specifying the page of the electronic book.

4. The method of claim 1, wherein the obtaining includes performing the obtaining using the bookmark device, and wherein the method includes performing the physical bookmarking of the physical book using the bookmark device.

5. The method of claim 1, wherein the digital bookmarking the electronic book includes providing a digital bookmark to highlight a certain row of text of a page of the electronic book to the exclusion of remaining rows of text of the digital book.

6. The method of claim 1, wherein the obtaining includes performing the obtaining using the bookmark device, wherein the method includes obtaining the image data with a longitudinal axis of the bookmark device being oriented horizontal to a certain row of text of a page of the physical book, and wherein the digitally bookmarking includes providing a digital bookmark to highlight within the electronic book an electronic row of text corresponding to the certain row of text.

7. The method of claim 1, wherein the obtaining includes performing the obtaining using the bookmark device, wherein the method includes obtaining the image data with an imaging area of the bookmark device opposing a certain row of text of a page of the physical book, and wherein the digitally bookmarking includes providing a digital bookmark to highlight within the electronic book an electronic row of text corresponding to the certain row of text.

8. The method of claim 1, wherein the obtaining is performed using the bookmark device, wherein the method includes displaying a user moveable marker on a manually operated display that displays an electronic page of the electronic book, wherein the user moveable marker is configured to be moveable to mark a certain row of text out of a plurality of displayed rows of text, generating a text based message based on a location of the user moveable marker, the text based message specifying a certain text row marked by the marker, and outputting a communication to display on a display area of the bookmark device the text based message.

9. The method of claim 1, wherein the obtaining is performed using the bookmark device, the bookmark device having imaging functionality, wherein the method includes displaying a user moveable marker on a manually operated display that displays an electronic page of the electronic book, wherein the user moveable marker is configured to be moveable to mark a certain row of text out of a plurality of displayed rows of text, and performing digital bookmarking of the electronic book based on a location of the moveable marker.

10. The method of claim 1, wherein the obtaining is performed using the bookmark device, the bookmark device having imaging functionality, and wherein the method includes determining an orientation of the bookmark device based on a direction of text represented in the image data.

11. The method of claim 1, wherein the bookmark device includes an elongated width dimension that is longer than a height dimension of the bookmark device, and further includes an elongated image sensor pixel array having pixels that extend widthwise on the bookmark device, wherein the selecting a certain row of text of the physical book page to the exclusion of remaining rows of text of the physical book page includes placing the bookmark device in contact with and face down on the physical book page so that the elongated image sensor pixel array having pixels opposes the certain row of pixels without opposing the remaining rows of text of the physical book page.

12. The method of claim 1, wherein the bookmark device includes an elongated width dimension that is longer than a height dimension of the bookmark device, and further includes an elongated image sensor pixel array having pixels that extend widthwise on the bookmark device, wherein the selecting a certain row of text of the physical book page to the exclusion of remaining rows of the physical book page includes placing the bookmark device in contact with and face down on the physical book page so that the elongated image sensor pixel array having pixels opposes the certain row of text of the physical book page and one or more additional rows of text of the physical book page, obtaining an image data representation of the certain row of text and one or more additional row of text and digitally cropping the portion of the representation representing the one or more additional row of text.

13. The method of claim 1, wherein the bookmark device includes an elongated width dimension that is longer than a height dimension of the bookmark device, and further includes an elongated image sensor pixel array having pixels that extend widthwise on the bookmark device, wherein the selecting a certain row of text of the physical book page to the exclusion of remaining rows of text of the physical book page includes placing the bookmark device in contact with and face down on the physical book page so that the elongated image sensor pixel array having pixels opposes the certain row of text of the physical book page and one or more additional rows of text of the physical book page while being centered on the certain row of text of the physical book page, obtaining an image data representation of the certain row of text and one or more additional row of text and digitally cropping the portion of the representation representing the one or more additional row of text based on the portion of the representation representing the certain row of text being more centrally located in the representation than the portion of the representation representing the one or more additional row.

14. The method of claim 1, wherein the bookmark device includes an elongated width dimension that is longer than a height dimension of the bookmark device, and further includes an image sensor pixel array, wherein the bookmark device is configured so that image data captured using the image sensor pixel array is in focus when the bookmark device is placed face down in contact with a surface having text in a manner that the image sensor pixel array opposes the text of the surface, wherein the selecting a certain row of text of the physical book page to the exclusion of remaining rows of text of the physical book page includes placing the bookmark device in contact with and face down on the physical book page so that the image sensor pixel array opposes the certain row of text of the physical book page.

15. A method comprising:
obtaining image data representing page content of a physical book, wherein the obtaining image data is responsive to physical bookmarking of the physical book;
running a character recognition process to process the image data for providing a text string of machine encoded text corresponding to text of the physical book;
identifying within a data repository that stores one or more electronic book a string of text of an electronic book that matches the text string of machine encoded text; and
based on the identifying, digitally bookmarking the electronic book, wherein the digitally bookmarking is synchronized to the physical bookmarking so that a digital bookmark of the electronic book is provided at a location of the electronic book corresponding to a location of the physical book that is bookmarked by the physical bookmarking, wherein the obtaining includes performing the obtaining using a bookmark device having imaging functionality, wherein the method includes detecting that the bookmark device has been set, wherein the detecting includes examining a focus attribute of collected image data collected using the bookmark device and wherein the method includes performing responsively to the detecting one or more of the following selected from the group consisting of (a) the running a character recognition process; (b) the identifying and (c) the digitally bookmarking.

16. The method of claim 15, wherein the image data is provided by the bookmark device having imaging functionality, the bookmark device being operative so that in focus image data is collected using the bookmark device when the bookmark device is placed in contact with a book page, wherein the method includes contacting the physical book page to collect the image data and for performing physical bookmarking of the physical book.

17. The method of claim 15, wherein the obtaining is performed using the bookmark device, the bookmark device being used to perform physical bookmarking of the physical book page, wherein the physical bookmarking includes selecting a certain row of text of the physical book page to the exclusion of remaining rows of text of the physical book page, and wherein the method includes highlighting in electronic book a certain text row of the electronic book corresponding to the certain row of text.

18. The method of claim 17, wherein the method includes performing responsively to the detecting the running a character recognition process.

19. The method of claim 17, wherein the method includes performing responsively to the detecting the identifying.

20. The method of claim 17, wherein the method includes performing responsively to the detecting the digitally bookmarking.

* * * * *